United States Patent
Rhodes et al.

(10) Patent No.: US 6,955,386 B2
(45) Date of Patent: Oct. 18, 2005

(54) UNDERFLOOR STOWAGE OF A FOLDING SEAT IN A VEHICLE

(75) Inventors: Louis A Rhodes, Farmington Hills, MI (US); Douglas J Quigley, Rochester, MI (US); Joseph L Salani, Oxford, MI (US); Carl Mather, Lake Orion, MI (US); John V Keane, Auborn Hills, MI (US); David J Ewers, Leonard, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 61 days.

(21) Appl. No.: 10/645,971

(22) Filed: Aug. 22, 2003

(65) Prior Publication Data

US 2004/0100114 A1 May 27, 2004

Related U.S. Application Data

(60) Provisional application No. 60/405,453, filed on Aug. 23, 2002.

(51) Int. Cl.$^7$ .................................. B60N 2/10
(52) U.S. Cl. .................. 296/65.09; 297/15; 297/334
(58) Field of Search ................ 296/65.09, 65.11; 297/15, 326, 334, 336

(56) References Cited

U.S. PATENT DOCUMENTS

| | | | |
|---|---|---|---|
| 847,707 A | 3/1907 | Spindler | |
| 1,649,608 A * | 11/1927 | Matthews | 296/65.09 |
| 1,887,947 A | 11/1932 | Savale | |
| 4,005,902 A | 2/1977 | Balin | |
| 4,699,418 A | 10/1987 | Plavetich | |
| 4,846,520 A | 7/1989 | Acuto et al. | |
| 4,925,228 A | 5/1990 | Pipon et al. | |
| 5,038,437 A | 8/1991 | Russell et al. | |
| 5,195,795 A | 3/1993 | Cannera et al. | 296/65.1 |
| 5,269,581 A | 12/1993 | Odagaki et al. | 296/66 |
| 5,482,349 A | 1/1996 | Richter et al. | |
| 5,492,386 A | 2/1996 | Callum | 296/64 |
| 5,527,087 A | 6/1996 | Takeda et al. | |
| 5,570,931 A | 11/1996 | Kargilis et al. | |
| 5,839,773 A | 11/1998 | Ban et al. | 296/65.09 |
| 5,868,451 A | 2/1999 | Uno et al. | |
| 5,871,255 A | 2/1999 | Harland et al. | |
| 5,890,758 A | 4/1999 | Pone et al. | |
| 5,927,789 A | 7/1999 | Mezzadri et al. | |
| 5,975,612 A | 11/1999 | Macy et al. | |
| 5,979,964 A | 11/1999 | Ban et al. | 296/66 |
| 6,000,751 A | 12/1999 | Kato et al. | 297/15 |
| 6,089,641 A | 7/2000 | Mattarella et al. | |
| 6,106,046 A | 8/2000 | Reichel | 296/65.09 |

(Continued)

FOREIGN PATENT DOCUMENTS

EP 000120817 10/1984

(Continued)

*Primary Examiner*—Dennis H. Pedder
(74) *Attorney, Agent, or Firm*—Ralph E. Smith

(57) ABSTRACT

A folding seating apparatus, for on-board stowage of an optionally deployable passenger seat, in a vehicle having a floor defining a floor surface that may be entirely flat when the seating apparatus is stowed. The seating apparatus includes a stowable seat having a seat cushion supported on one or more legs above the floor, a seat back that is foldable upon the seat cushion for stowage of the seat, and a seat receiving recess in the floor for on-board stowage of the seat. The seat is movable transversely in the vehicle in addition to being stowable.

14 Claims, 8 Drawing Sheets

U.S. PATENT DOCUMENTS

| | | |
|---|---|---|
| 6,123,380 A | 9/2000 | Sturt et al. ................ 296/65.09 |
| 6,129,404 A | 10/2000 | Mattarella et al. |
| 6,129,405 A | 10/2000 | Miyahara et al. |
| 6,193,317 B1 | 2/2001 | Mitschelen et al. |
| 6,234,553 B1 | 5/2001 | Eschelbach et al. ..... 296/65.14 |
| 6,231,101 B1 | 6/2001 | Kamida et al. ................ 296/63 |
| 6,270,140 B1 | 8/2001 | Opfer et al. |
| 6,279,982 B1 * | 8/2001 | Nishimura et al. ....... 296/65.09 |
| 6,286,886 B1 * | 9/2001 | Odagaki .................. 296/65.11 |
| 6,293,603 B1 * | 9/2001 | Waku et al. .............. 296/65.09 |
| 6,332,650 B1 | 12/2001 | Krist et al. |
| 6,352,310 B1 | 3/2002 | Schmidt et al. |
| 6,371,559 B1 | 4/2002 | Kienzle et al. |
| 6,398,307 B1 | 6/2002 | Schmidt et al. |
| 6,406,084 B1 | 6/2002 | De Campos et al. |
| 6,416,107 B1 | 7/2002 | Kanaguchi et al. |
| 6,425,619 B2 | 7/2002 | Ney |
| 6,435,589 B2 * | 8/2002 | Shimizu et al. ........... 296/65.09 |
| 6,464,279 B1 | 10/2002 | Schambre et al. |
| 6,629,721 B1 | 10/2003 | Macey |
| 6,644,730 B2 | 11/2003 | Sugiura et al. |
| 6,648,393 B1 | 11/2003 | Milnar et al. |
| 6,682,120 B2 | 1/2004 | Kamida et al. |
| 6,688,666 B2 | 2/2004 | Neale et al. |
| 6,705,658 B2 | 3/2004 | Jach et al. |
| 6,837,530 B2 * | 1/2005 | Rudberg et al. ......... 296/65.09 |
| 2001/0002759 A1 | 6/2001 | Nishide |
| 2001/0054835 A1 | 12/2001 | Feng |
| 2003/0094830 A1 | 5/2003 | Kamida et al. |

FOREIGN PATENT DOCUMENTS

| | | |
|---|---|---|
| FR | 002575708 | 7/1986 |
| FR | 2735081 | 12/1996 |
| JP | 363227435 | 9/1988 |
| JP | 401095947 | 4/1989 |
| JP | 411005477 | 1/1999 |
| JP | 362198 | 2/2002 |
| JP | 2003094997 | 4/2003 |
| JP | 2003212017 | 7/2003 |
| KR | 98057165 | 9/1998 |
| WO | WO 0002/14104 | 2/2002 |

* cited by examiner

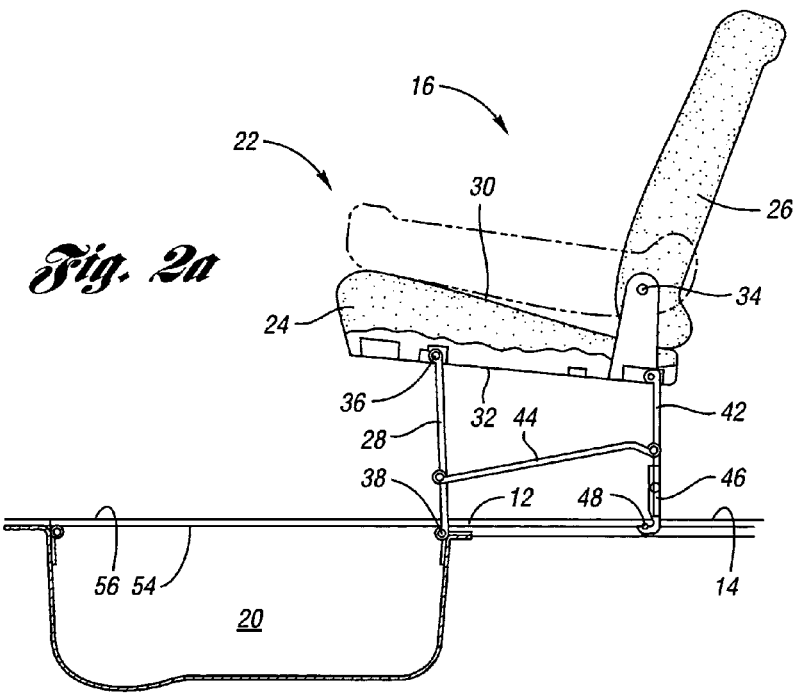
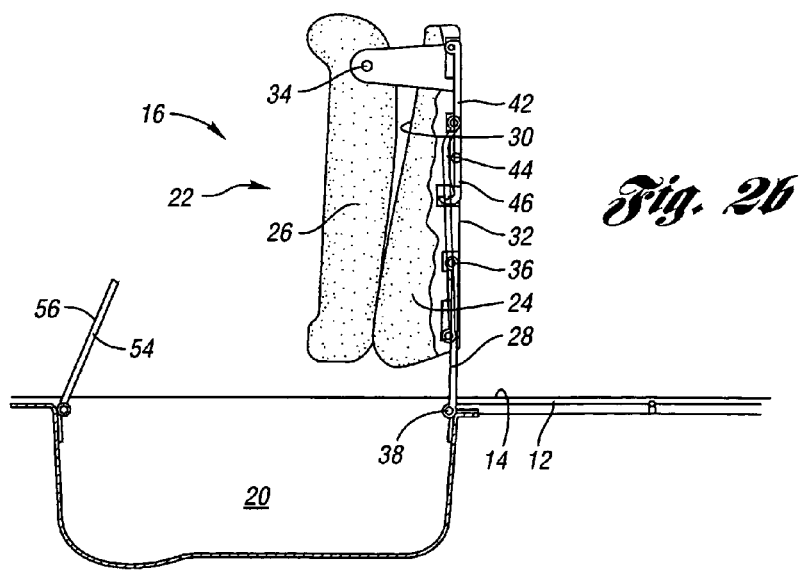

UNDERFLOOR STOWAGE OF A FOLDING SEAT IN A VEHICLE

CROSS-REFERENCE TO RELATED APPLICATION(S)

This application claims the benefit of Provisional Patent Application No. 60/405,453, filed Aug. 23, 2002.

TECHNICAL FIELD OF THE INVENTION

This invention relates to vehicles, such vans, mini-vans and sport utility vehicles, having a multi-use compartment that can be alternately configured for seating of passengers or carrying cargo, and more particularly to passenger seating that can be optionally stowed on-board such vehicles, for providing expanded cargo carrying capacity.

BACKGROUND OF THE INVENTION

In vehicles such vans, mini-vans and sport utility vehicles, it is desirable that passenger seating arrangements be optionally stowable on-board the vehicle, in a manner that provides a large, unimpeded volume for carrying cargo. It is also desirable that the stowable passenger seating arrangements have cushions that support passengers at a height above the floor that is approximately at the same level as the driver and any front seat passengers, so that the passengers seated on the stowable seats can enjoy the view through vehicle windows and enter and exit the stowable seats, when the stowable seats are deployed, without having to step up out of a seating well in the floor. It is especially desirable that the floor of the cargo area be flat when the seating is stowed, to facilitate loading and carrying large sized cargo, such as sheets of plywood, large cartons, or bulky items such as bicycles or other recreation equipment.

It is further desirable that the stowable seats be readily movable to provide a number of alternate interior configurations allowing optimal utilization of space inside the vehicle. It is highly desirable in this regard that seats be movable transversely across the vehicle, in addition to being stowable on-board the vehicle. In some vehicles it is also desirable and/or necessary that the seats be movable transversely from an outboard, deployed position, to an inboard position for stowage in a storage compartment below the floor in a vehicle where the vehicle frame is too narrow to allow the seat to be stored below the floor in a compartment that is located directly forward or aft of the seat.

U.S. Pat. No. 6,416,107 B1, to Kanaguchi, et al., discloses a forward facing bench-type seat mounted as the rearmost-row seat on a raised portion of a floor surface extending rearwardly from the rearmost-row seat, toward the rear of a vehicle. A seat receiving recess is formed in and extends downwardly from the raised floor surface extending rearwardly from the rearmost-row seat. The rearmost row seat can be folded in such a manner that a seat back thereof is brought down forwardly to be laid on a seat cushion thereof, and the folded seat can be turned rearwardly about rotation shafts to be received in the seat-receiving recess. The raised floor surface, in which the seat receiving recess is formed, is disposed at a level higher than a foot-resting floor seat for the rearmost-row seat. The rotation shafts on the seat cushion of the rearmost-row seat are disposed at a level that is lower than the floor surface, in which the seat-receiving recess is formed and also is lower than an upper side of the receiving recess.

The approach to providing stowable seating disclosed in Kanaguchi is less than desirable, because the seat must be mounted on a raised floor surface. The raised floor surface consumes space inside the vehicle that could be used for carrying cargo, and results in a floor surface that is stepped up at the rear, rather than being totally flat. Kanaguchi also does not disclose moving the seat transversely in the vehicle.

What is needed, is a new approach to providing passenger seating that can optionally be stowed on-board the vehicle in a manner providing the desired features and functionality described above.

SUMMARY OF THE INVENTION

Our invention provides a stowable, folding seating apparatus, for a vehicle having a floor defining a floor surface that may be entirely flat when the seating apparatus is stowed. The seating apparatus includes a stowable seat having a seat cushion supported on one or more legs above the floor, and a seat receiving recess in the floor for on-board stowage of the seat. The seat may also include a seat back that is foldable upon the seat cushion for stowage of the seat in the seat receiving recess.

In one form of our invention, the stowable seating apparatus includes a seat receiving recess in the floor, extending downward from the floor surface and opening upward through the floor surface, and a seat having a seat cushion and a leg operatively attaching the seat cushion to the floor for selective movement of the seat with respect to the seat receiving recess between a deployed position of the seat and a stowed position of the seat in the seat receiving recess.

The seat cushion has an upper surface for receiving the buttocks of a passenger when the seat is in the deployed position, and a lower surface facing the floor surface when the seat is in the deployed position. The seat cushion is inverted when the seat is in the stowed position with the upper surface of the seat cushion facing downward in the seat receiving recess and the lower surface of the seat cushion facing upward in the seat receiving recess.

The leg includes an upper pivot operatively attached to the lower surface of the seat cushion and a lower pivot operatively attached to the floor, for selective pivoting movement of the seat between the deployed and the stowed positions of the seat, by pivoting the seat cushion about the upper pivot, and pivoting the leg about the lower pivot between a substantially vertical deployed position of the leg and a substantially horizontal stowed position of the leg, with the leg in the substantially horizontal stowed position extending into the seat receiving recess in a direction substantially parallel to the floor surface.

In another form of a stowable seating apparatus, according to our invention, the seat receiving recess extends downward from the floor surface and opens upward through the floor surface. The seat has a seat cushion, a foldable seat back, and a leg operatively attaching the seat cushion to the floor for selective movement of the seat, with respect to the seat receiving recess, between a deployed position of the seat, an intermediate position of the seat, and a stowed position of the seat.

The seat cushion includes an upper surface for receiving the buttocks of a passenger when the seat is in the deployed position, and a lower surface facing the floor surface when the seat is in the deployed position. The foldable seat back is pivotably attached to the seat cushion to be foldable upon the upper surface of the seat cushion to a folded position of the seat back, and openable to an open position of the seat back for supporting the back of a passenger seated upon the cushion.

The leg has an upper pivot operatively attached to the lower surface of the seat cushion and a lower pivot operatively attached to the floor for selective movement of the leg between a substantially vertical deployed position of the leg and a substantially horizontal stowed position of the leg, with the leg in the substantially horizontal stowed position extending into the seat receiving recess in a direction substantially parallel to the floor surface. When the leg is in the substantially vertical deployed position of the leg, it supports the seat cushion in both the deployed position and the intermediate position of the seat. The seat cushion extends substantially perpendicular to the leg in the deployed position of the seat, and substantially parallel to the leg in the intermediate position of the seat.

The seat cushion is operatively attached to the upper pivot of the leg for selective movement with respect to both the seat receiving recess and the leg, between the deployed position of the seat, whereat the seat cushion extends substantially perpendicular to the leg with the leg in the deployed position of the leg and the seat back in either the open or the folded position, and the intermediate position of the seat whereat the seat cushion with the seat back folded thereupon extends substantially parallel to the leg with the leg in the deployed position of the leg.

The seat is selectively movable between the intermediate position of the seat and the stowed position of the seat within the seat receiving recess by pivoting the seat about the lower pivot of the leg.

In some forms of our invention, the seat is also selectively movable in a transverse direction with respect to the seat receiving recess. The seat cushion may be operatively attached to the leg and floor for translating movement in a transverse direction with respect to the seat receiving recess, between a first transverse position of the seat whereat the seat cannot be pivoted into the seat receiving recess and a second transverse position of the seat whereat the seat can be pivoted into the seat receiving recess.

In some forms of our invention, the seat does not extend above the floor surface when stowed in the seat receiving recess in the floor. The seating apparatus may include a cover for closing the seat receiving recess, with the cover having an upper surface thereof extending substantially parallel to the floor surface when the cover is closing the seat receiving recess.

A seating apparatus, according to our invention, may include a passenger seat in which the seat cushion, seat back and leg are foldable in a forward direction in the vehicle, for stowage in a seat receiving recess located forward of the deployed position of the seat. In alternate forms of our invention, the seat cushion, seat back and leg are foldable in a rearward direction in the vehicle, for stowage in a seat receiving recess located rearward of the deployed position of the seat. In yet other forms of our invention, the seat cushion, seat back and leg are foldable in a transverse direction in the vehicle, for stowage in a seat receiving recess located beside of the deployed position of the seat.

Our invention may also take the form of a method for operating a seating apparatus according to our invention, as described above or in the subsequent detailed description.

The foregoing and other features and advantages of our invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

BRIEF DESCRIPTION OF THE DRAWINGS

FIGS. 2a–2d are schematic side views of the first exemplary embodiment of FIG. 1, showing the second row seating apparatus in a deployed position, an intermediate position, a stowed position, and a tilted position.

DETAILED DESCRIPTION OF THE PREFERRED EMBODIMENT(S)

Figure 1:
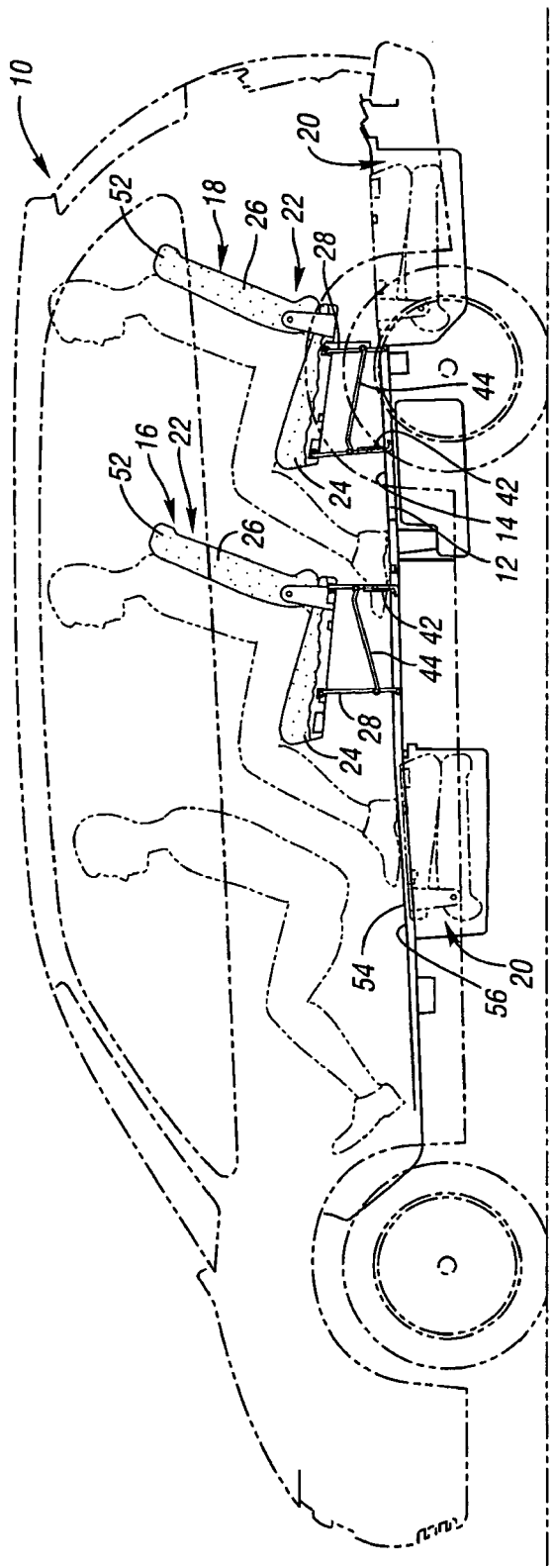
FIG. 1 is a side view of vehicle, showing a first embodiment of the invention, in the form of second row seating apparatus, and a second embodiment of the invention, in the form of a third row seating apparatus.

FIG. 1 shows a vehicle 10 having a floor 12 defining a flat upper surface 14 of the floor, including a first exemplary embodiment of our invention, in the form of a stowable second row seating apparatus 16, and a second exemplary embodiment of our invention, in the form of a stowable third row seating apparatus 18.

FIGS. 1, 2a–d and 3 show details of the construction and operation of the stowable second row seating apparatus 16. The second row seating apparatus 16 includes a seat receiving recess 20 in the floor 12 of the vehicle 10, and a seat 22 that is stowable on-board the vehicle 10, below the floor surface 14, in the seat receiving recess 20. A cover 54, having a surface 56 extending substantially parallel to the floor surface 14, is hinged to the floor 12 for covering the seat receiving recess 20.

The seat receiving recess 20, in the floor 12, extends downward from the floor surface 14 and opens upward through the floor surface 14.

Figure 2C:
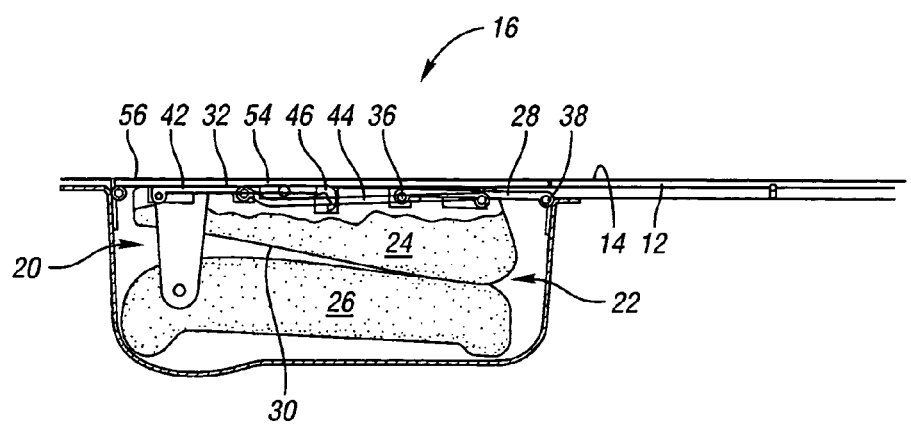
Figure 2B:
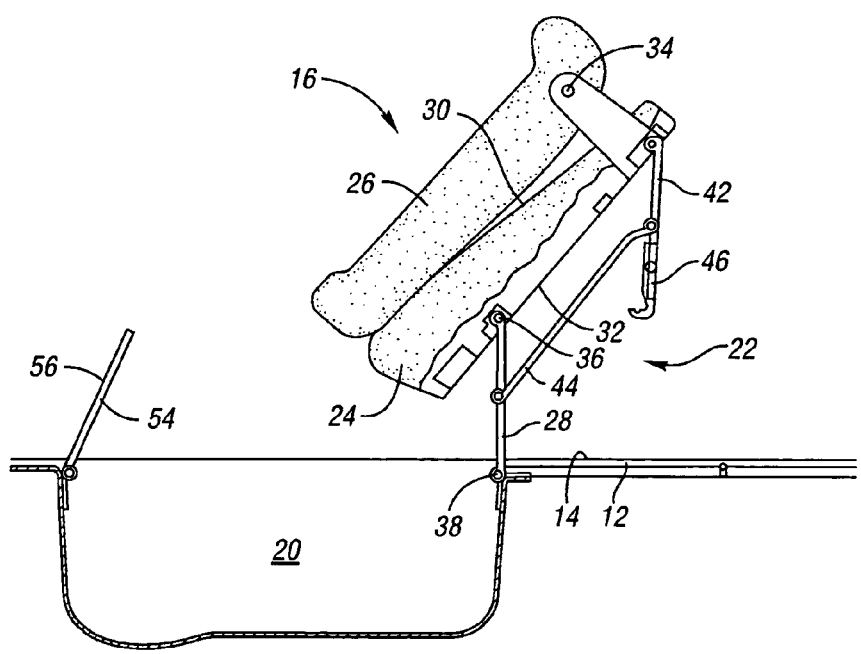

The seat 22 includes a seat cushion 24, a foldable seat back 26, and a pair of legs 28 operatively attaching the seat cushion 24 to the floor 12, for selective movement of the seat 22 with respect to the seat receiving recess 20, between a deployed position of the seat 22, an intermediate position of the seat, and a stowed position of the seat 22. The deployed position of the seat 22 is shown in FIGS. 1, and 2a. The intermediate position of the seat is shown in FIG. 2b, and the stowed position of the seat 22, in the seat receiving recess 20, is shown in FIG. 2c. FIG. 1 also illustrates the stowed position of the seat 22 for both the second row seating apparatus 18 and third row seating apparatus 16. FIG. 2d shows the seat 22 in a tilted position for facilitating entry into and exit from the third row seating apparatus 18.

The seat cushion 24 has an upper surface 30 for receiving the buttocks of a passenger (as illustrated in FIG. 1) when the seat 22 is in the deployed position, and a lower surface 32 facing the floor surface 14 when the seat 22 is in the deployed position. The foldable seat back 26 is pivotably attached, as indicated at 34, to the seat cushion 24, to be foldable upon the upper surface 30 of the seat cushion 24 to a folded position of the seat back 26, as shown in phantom lines in FIG. 2a, and openable to an open position of the seat back 26, as shown in solid lines in FIG. 2a, for supporting the back of a passenger seated upon the seat cushion 24, as illustrated in FIG. 1.

Each of the legs 28 has an upper pivot 36 operatively attached to the lower surface 32 of the seat cushion 24, and a lower pivot 38 operatively attached to the floor 12. The lower pivot 38 allows the seat 22 to be moved between the deployed and intermediate positions of the seat 22. Having the legs 28 pivoted in this manner allows the legs 28 to be selectively moved between a substantially vertical deployed position of the legs 28 and a substantially horizontal stowed position of the legs 28, with the legs 28 in the substantially horizontal stowed position extending into the seat receiving recess 20 in a direction substantially parallel to the floor surface 14. When the legs 28 are in the substantially vertical deployed position of the legs 28, they support the seat cushion 22 in both the deployed position and intermediate positions of the seat, as shown in FIGS. 2a and 2b respectively, with the seat cushion 24 extending substantially perpendicular to the legs 28 in the deployed position of the seat 22, and the seat cushion 24 extending substantially parallel to the legs 28 in the intermediate position of the seat 22.

The seat cushion 24 is operatively attached to the upper pivot 36 of the legs 28 for selective movement with respect to both the seat receiving recess 20 and the legs 28, between the deployed and intermediate positions of the seat 22. When the seat 22 is in the deployed position, as shown in FIG. 2a the seat cushion 24 extends substantially perpendicular to the legs 28 with the legs 28 in the deployed position of the legs 28 and the seat back 26 in either the open or the folded position. When the seat 22 is in the intermediate position, as shown in FIG. 2b, the seat cushion 24, with the seat back 26 folded thereupon, extends substantially parallel to the legs 28 with the legs in the stowed position of the legs 28. The seat 22 is selectively movable between the intermediate position of the seat 22 and the stowed position of the seat 22 within the seat receiving recess 20, as shown in FIG. 2c, by pivoting the seat 22 about the lower pivot of the leg 28.

When the seat 22 is in the stowed position, the seat cushion 24 is inverted from its position when the seat 22 is deployed, with the upper surface 30 of the seat cushion 24 facing down into the seat receiving recess 20 and the lower surface 32 of the seat receiving recess 20 facing upward.

The stowable seating apparatus 16 further includes a pair of second legs 42 pivotably attached to the lower surface 32 of the seat cushion 24 for movement between a deployed position of the second legs 42 and a stowed position of the second legs 42. In the deployed position of the second legs 42, as shown in FIGS. 1, and 2a, the second legs 42 extend substantially perpendicularly to the seat cushion 24 for supporting the seat cushion 24 above the floor 12 when the seat 22 is in the deployed position. In the stowed position of the second legs 42, as shown in FIGS. 2b and 2c, the second legs 42 extend substantially parallel to the seat cushion 24. One or more helper links 44 are operatively connected between the legs 28 and the second legs 42 for pivoting the second legs 42 from the stowed position of the second legs 42 to the deployed position of the second legs 42, as the seat cushion 24 is pivoted about the upper pivot 36 from the intermediate position to the deployed position of the seat 22, and for pivoting the second legs 42 from the deployed position of the second legs 42 to the stowed position of the second legs 42 as the seat cushion 24 is pivoted about the upper pivot 36 from the deployed position to the intermediate position of the seat 22.

A releasable latch 46 is attached to the distal end of each of the second legs 42 for engaging a seat anchorage 48 mounted in the floor 12, to lock the seat 22 in the deployed position of the seat 22. The seat anchorage 48 may be of the conventional dog-bone, bar type, located in a small receptacle embedded in the floor 12, as is known in the art.

The steps required for stowing the seat 22 in the seat receiving recess 20 are shown sequentially in FIGS. 2a–2c. The seat back 26 is folded down upon the seat cushion, as shown in FIG. 2a, to the folded position of the seat back 26. The latches 46 on the distal ends of the second legs 42 are released, to disengage the latches 46 from the seat anchorages 48, and the seat cushion 22 is pivoted about the upper pivot 36 of the legs 28, to move the seat 22 with the seat back 26 folded upon the seat cushion 24 from the deployed position of the seat 22, as shown in FIG. 2a, to the intermediate position of the seat 22, as shown in FIG. 2b. The cover 54 is opened to allow the seat 22 to enter the seat receiving recess 20. The seat 22 is then pivoted around the lower pivot 38 into the seat receiving recess 20, to move the seat 22 from the intermediate to the stowed position of the seat 22, and the cover 54 is closed. The steps are reversed for moving the seat 22 from the stowed position to the deployed position of the seat 22.

We contemplate that a seating apparatus according to our invention may also include additional latches, and devices known in the art, such as force generating and/or a motion damping devices, for example, operatively attached to assist and facilitate the efforts of a person in moving the seat 22 between the deployed, intermediate and stowed positions of the seat 22. It is contemplated that a force generating/motion resisting device can be provided by any number of suitable devices known in the art, such as a tension pivot having a torsion spring, a tension spring, a compression spring, a gas charged cylinder, or a dashpot. In embodiments of our invention using such devices, it may be desirable to incorporate a force generating/motion resisting device into the lower pivot 38, or into other pivoting joints of the mechanism formed by the seat cushion 24, leg 28, second leg 42, helper ling 44 and floor 12.

The second exemplary embodiment of a seating apparatus 18, according to our invention, is identical in construction and operation to the first exemplary embodiment 16, as described above, except for the location of the seat receiving recess 20 with respect to the seat 22, and the location of attachment of the seat back 26 to the seat cushion 24.

As shown in FIG. 1, in the third row seating apparatus 18, the seat receiving recess 20 is located behind the seat 22, and in the seating apparatus 16, the seat receiving recess 20 is located in front of the seat 22.

In the third row seating apparatus 18, the seat back 26 is attached to the seat cushion 24 at the rear (as shown in FIG. 1) of the seat cushion 24 at a point above the legs 28, and the distal end 52 of the seat back 26 folds away from the seat receiving recess 20, for moving the seat back 26 to the folded position thereof, when the seat 22 is in the deployed position.

In the second row seating apparatus 16, the seat back 26 is attached to the seat cushion 24 at the rear (as shown in FIG. 1) of the seat cushion 24, but at a point above the second legs 42, rather than above the legs 28 as was the case in the third row seating apparatus 16, and the distal end 52 of the seat back 26 folds toward the seat receiving recess 20, for moving the seat back 26 to the folded position thereof, when the seat 22 is in the deployed position.

In some embodiments of our invention, it may also be desirable that the seat 22 be movable in a transverse direction with respect to the seat receiving recess 20, for allowing the seating configuration in the vehicle to be selectively altered, or for allowing the seat 22 to be stored in a seat receiving recess 22 that is offset transversely, i.e. in the cross vehicle direction, from a desired transverse location of the seat 22, when the seat 22 is in the deployed position of the seat 22. It may also be desirable to have the seat cushion 24, with the foldable back 26 attached thereto, be operatively attached to the legs 28 and floor 12 for translating movement, in a transverse direction with respect to the seat receiving recess 20, between one or more non-pivotable transverse positions of the seat 22, whereat the seat 22 cannot be pivoted into the seat receiving recess 20, and a pivotable transverse position of the seat 22 whereat the seat 22 is properly aligned with the seat receiving recess 20 for allowing the seat 22 to be pivoted into the seat receiving recess 20.

Figure 3:
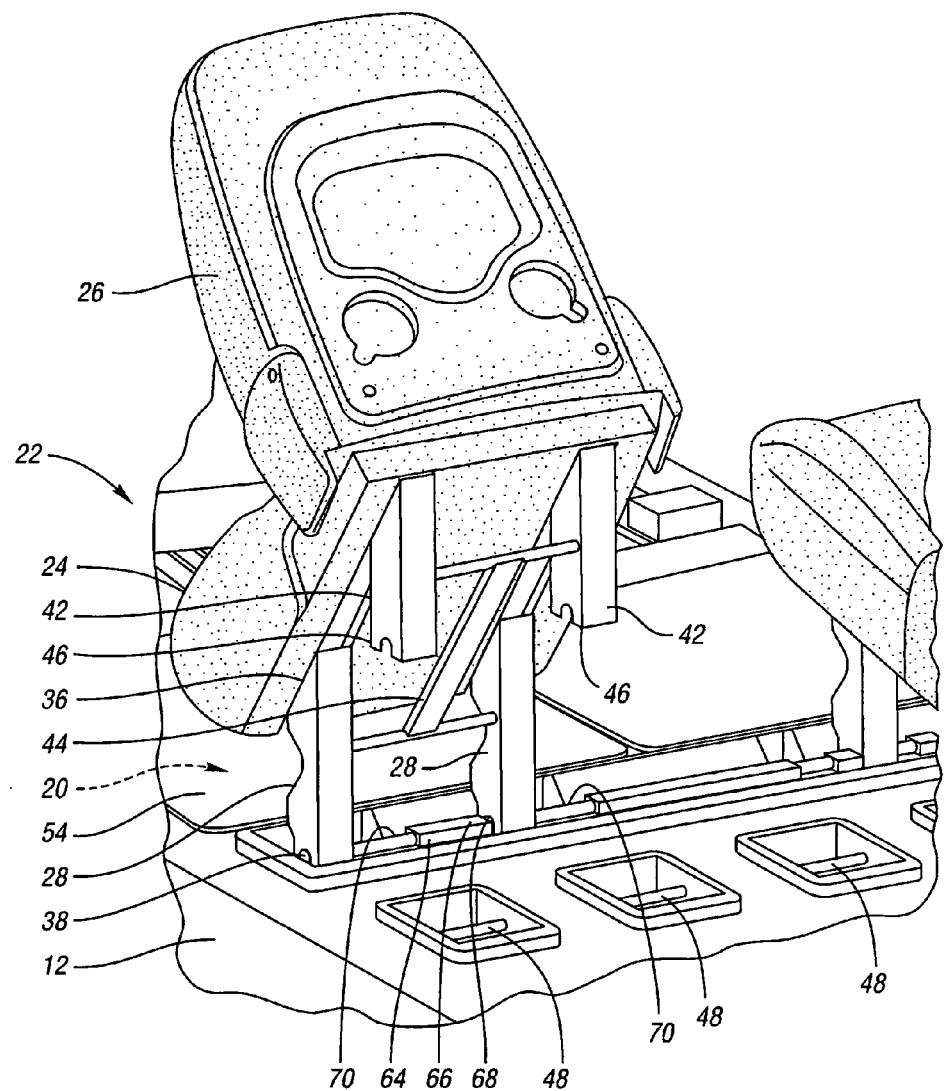
FIG. 3 is a perspective view of a second row seating apparatus according the embodiment shown in FIG. 1, and FIGS. 2a–2d.

FIG. 3 shows an embodiment of the invention in which the seat 22 in the second row seating apparatus 16 is selectively movable transversely along the lower pivot 38, between an outboard non-pivotable transverse position, an inboard non-pivotable transverse position, and a pivotable transverse position located between the outboard and inboard non-pivotable transverse positions. As a result of this arrangement, the seating configuration in the vehicle 10 can be readily changed, as shown in FIGS. 4a–4k, to provide a number of advantageous options for carrying passengers and/or cargo.

FIGS. 4a–4k show a second row seating apparatus 16, according to our invention, having a left and a right seat, designated 22L and 22R, in a vehicle 10, having a front seat 60 and a flat floor 12.

Figure 4A:
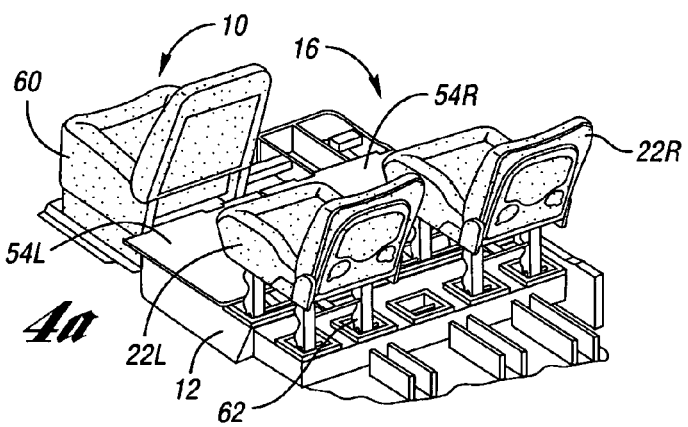
FIGS. 4a–4k are perspective views of an exemplary embodiment of a second row seating apparatus, according to the invention, in a vehicle, showing a number of the many alternate passenger seating and cargo storage options provided by the invention.

FIG. 4a shows the left and right seats 22L, 22R deployed in their respective outboard non-pivotable transverse positions, to form a gap 62 between the seats for facilitating entry into and exit from the rear of the vehicle 10 through the second row seating apparatus 16.

Figure 4B:
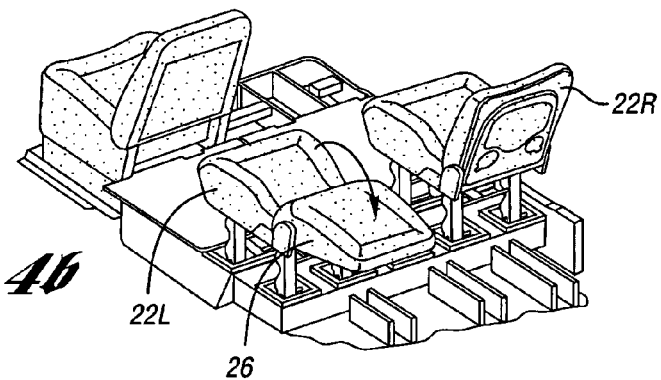

FIG. 4b shows the seats 22L and 22R in the same position as shown in FIG. 4a, but shows the seat back 26 reclined, as is known in the art.

Figure 4C:
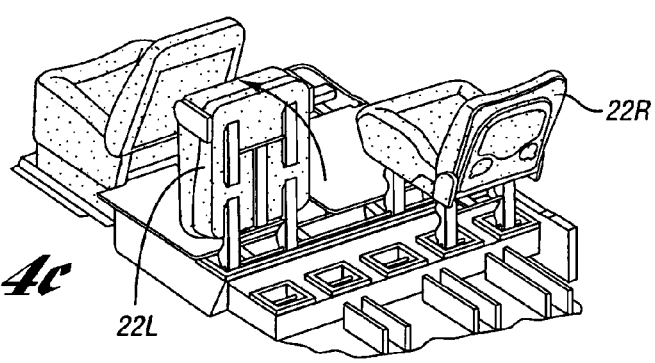

FIG. 4c shows the left seat 22L rotated to the intermediate position, while still located in the outboard non-pivotable transverse position, to thereby provide additional cargo space behind the left seat 22L or to facilitate entry into or exit from the third row seating apparatus 18.

Figure 4D:
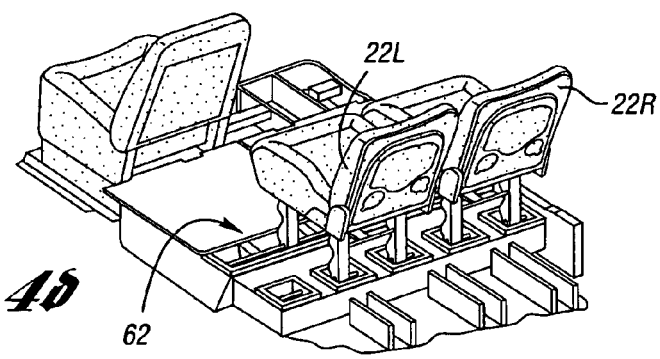

FIG. 4d shows the left seat 22L moved to its inboard non-pivotable transverse position, to thereby form a bench seat at the right side of the vehicle 10, in conjunction with the right seat 22R, and move the gap 62, for entry into or exit from the rear of the vehicle 10, to the left side of the vehicle 10. Although not specifically shown it will be understood that by leaving the left seat 22L in its outboard non-pivotable transverse position, and moving the right seat 22R to its inboard non-pivotable transverse position, the bench seat can be positioned on the left side of the vehicle 10, and the gap 62 for entry into and exit from the rear of the vehicle 10 through the second row seating apparatus 16 positioned to the right side of the vehicle 10.

Figure 4E:
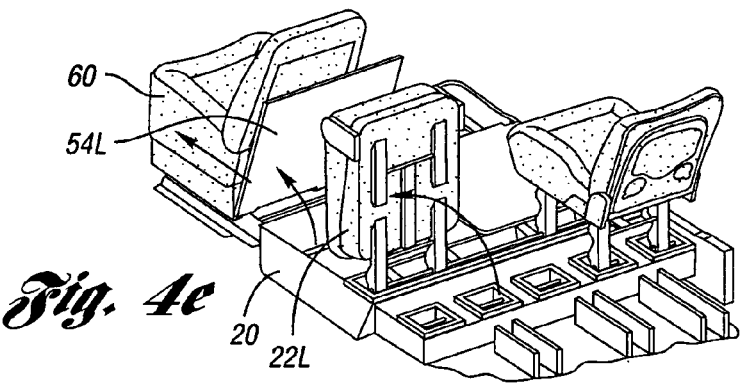

FIG. 4e shows the left seat 22L rotated to the intermediate position, and shifted transversely to the pivotable transverse position, with the cover 54L raised, in preparation for rotating the seat 22L forward into the seat receiving recess 20. In some embodiments of our invention, it may be necessary to have the front seat 60 move forward to allow the cover 54L to open fully.

Figure 4F:
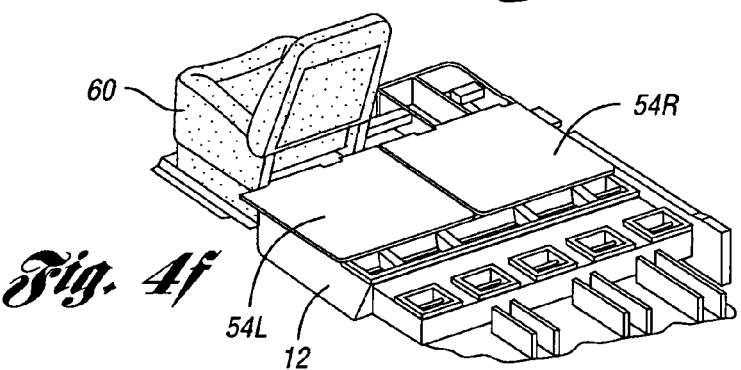

FIG. 4f shows both the left and right seats 22L, 22R stowed beneath their respective covers 54L, 54R, which lie substantially parallel to the floor 12 when closed, to provide a flat load floor behind the front seat 60.

Figure 4G:
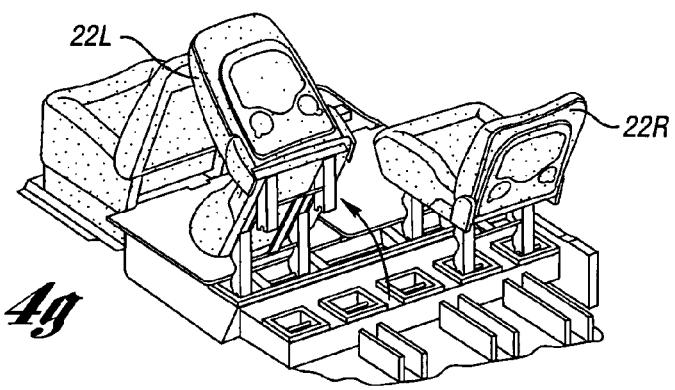

FIG. 4g shows the left seat 22 in the outboard non-pivotable transverse position, and tilted forward to facilitate ingress/egress to the third row seating apparatus 18.

Figure 4H:
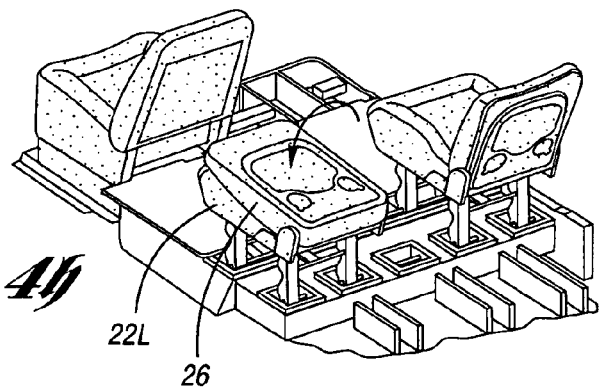

FIG. 4h shows the seat back 26 of the left seat 22L in the folded position, while the left seat 22L is deployed in the outboard non-pivotable transverse position, to illustrate that the back side of the seat backs 26 of the left and right seats 22L, 22R may be utilized as tables, in the folded position, as is known in the art.

Figure 4I:
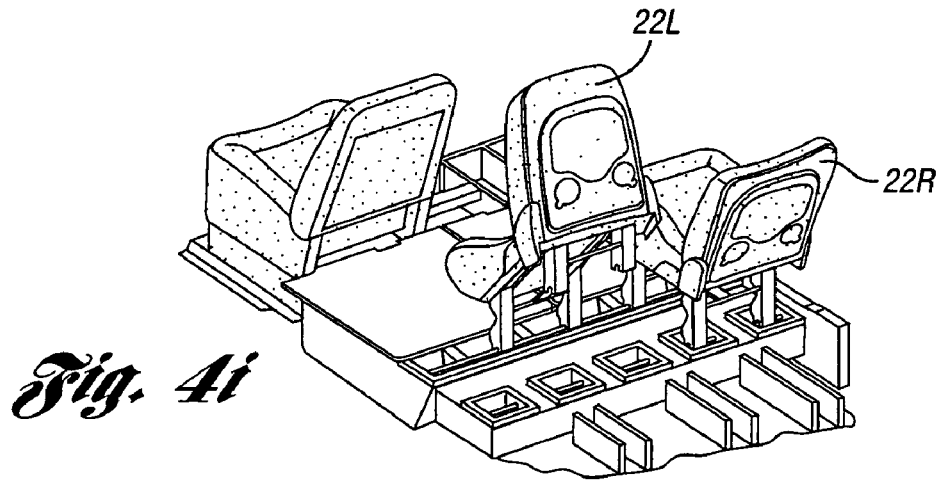

FIG. 4i illustrates the left seat 22L in the process of being shuttled between its transverse positions.

Figure 4J:
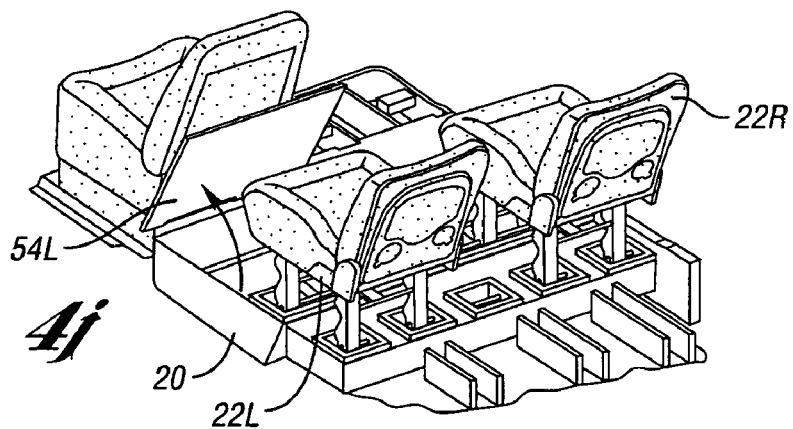

FIG. 4j shows that the seat receiving recess 20 may be used for on-board storage, accessible from inside of the vehicle 10 by lifting the cover 54L, when the seats 22L, 22R are not stowed in the seat receiving recess 20.

Figure 4K:
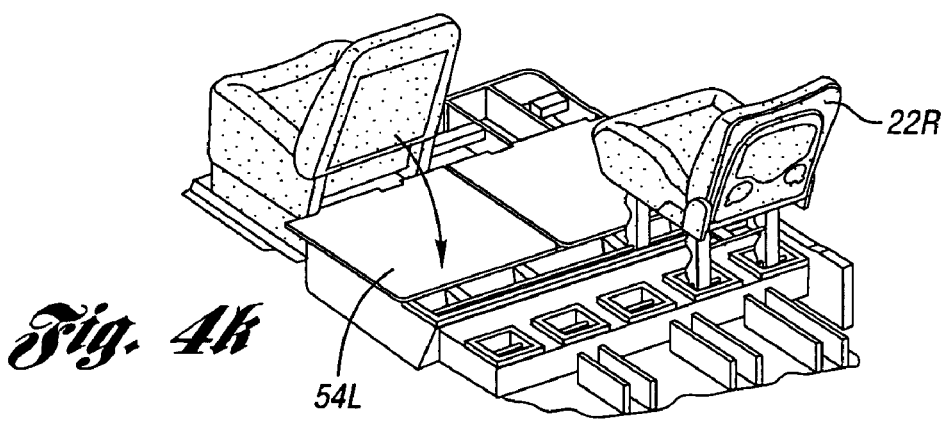

FIG. 4k shows the left seat 22L stowed under the cover 54L, and the right seat 22R deployed in its outboard non-pivoting transverse position.

It will be appreciated the other configurations can also be provided by the second row seating apparatus 16 illustrated in FIGS. 4a–4k, to accommodate the operational circumstances of the vehicle 10.

The manner in which the seat 22 of FIG. 3 is translated between transverse positions, and prevented from pivoting into the seat receiving recess 20 except when located in the pivotable transverse position, is illustrated in FIG. 3. The lower pivot 38, of the embodiment of the seat 22 shown in FIG. 3, includes a bar 64 non-rotatably attached to the floor 12 and extending transversely to the seat receiving recess 20, along the upper rear edge of the opening of the seat receiving recess 20. The lower ends of the legs 28 are attached to slide transversely along the bar 64. The bar 64 includes a flange 66, or key, extending upward from the bar 64 to engage a corresponding slot 68 in the lower end of the legs 28, for preventing rotation of the legs 28 and seat 22 about the bar 64.

The flange 66 on the bar 64 includes a pair of gaps 70 that are sized and spaced appropriately along the bar 64, so that when the seat 22 is located in the pivotable transverse position, the legs 28 align with the gaps 70, where the flange 66 is not present, and the seat 22 can be pivoted about the bar 64 into the seat receiving recess 20 for stowage. When the seat 22 is positioned with the legs 28 to the left of the gaps 70 in the flange 66, the seat 22 is in a first non-rotatable transverse position, and when the seat 22 is positioned with the legs 28 to the right of the gaps 70, the seat 22 is in a second non-rotatable transverse position.

As shown in FIG. 3, three seat anchorages 48 are provided in the floor 12, for engaging the latches 46 on the distal ends of the second legs 42 of the seat, for locking the seat in a deployed position at either the first or the second non-pivotable transverse positions of the seat 22. If the seat 22 shown in FIG. 3 were the left seat 22L, as shown in FIGS. 4a–k, for example, the latches 46 on the ends of the second legs 42 would engage the left and center seat anchorages 48, when the seat 22L is in the outboard non-pivotable transverse position, and would engage the right and center seat anchorages 48, when the seat 22L is in the inboard non-pivotable transverse position.

In some embodiments of our invention, it may be desirable to configure the upper pivot 36, rather than the lower pivot 38, to include a locking mechanism, similar to the one described above with regard to FIG. 3, for locking the seat cushion 24 against being pivoted about the upper pivot 36 when the seat cushion 24 is in a first transverse position of the seat cushion 24 with respect to the leg 28, and allowing the seat cushion 24 to be pivoted about the upper pivot 36 when the seat cushion 24 is in a second transverse position of the seat cushion 24 with respect to the leg 28. One approach to providing such an upper pivot configuration is shown in FIGS. 5 and 6.

Figure 5:
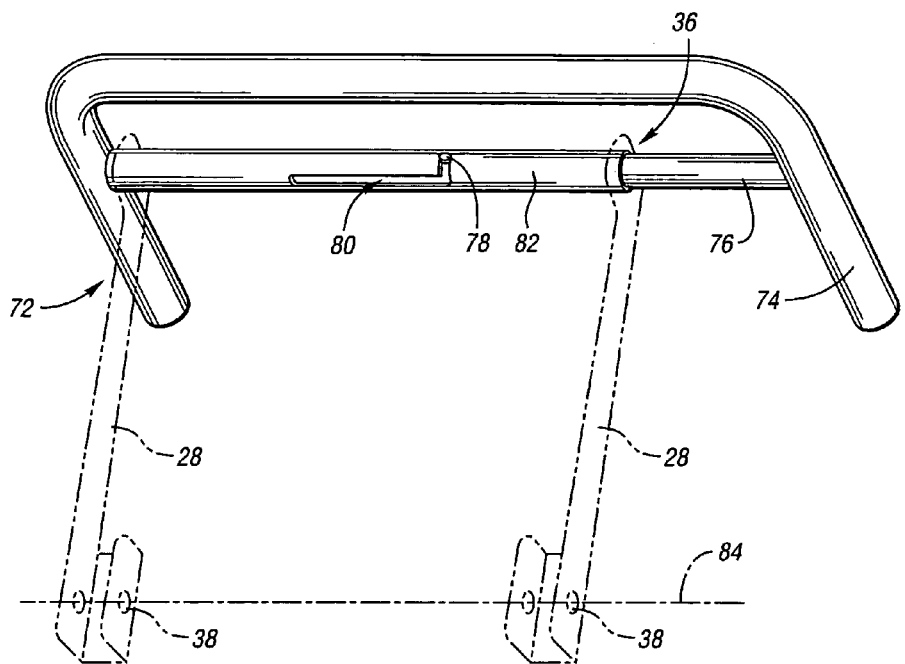
FIGS. 5 and 6 are perspective views of a frame attachable to the underside of the seat cushion of a seat, according to our invention, allowing the seat cushion to be selectively moved transversely in the vehicle.
Figure 6:
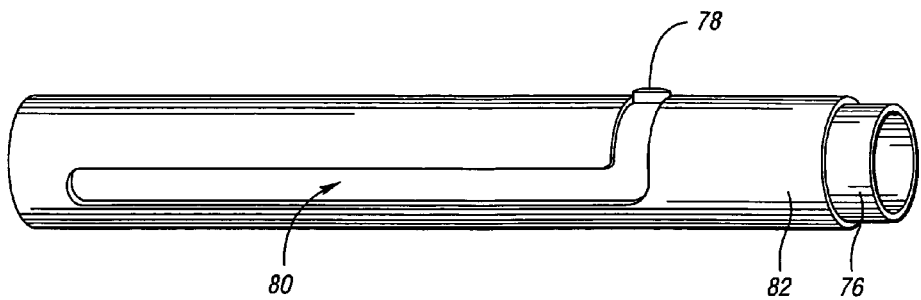

FIG. 5 is a perspective view looking upward from the floor 12 along the legs 28 toward a seat frame 72 to which the lower surface of the seat cushion 24 would be attached. The seat frame includes a U-shaped rail 74 configured to extend across the seat cushion 24 along the front edge of the seat cushion 24, and an upper pivot bar 76 extending transverse to the seat cushion 24 and seat receiving recess 20, when the seat frame 72 is mounted in a seating apparatus according to our invention.

The upper pivot bar 76 is non-rotatably attached at each end thereof to one of the legs of the U-shaped rail 74. An upper pivot pin 78 is attached to and extends radially outward from the pivot bar 76 to engage an L-shaped guide slot 80 in a pivot tube 82 fixedly joining the upper ends of the legs 28. FIG. 6 shows an enlarged view of the upper pivot pin 78 and the L-shaped slot 80. The pivot pin 78 extends outward from the pivot bar 76 in a direction generally parallel to the seat cushion 24 toward the seat receiving recess 20, when the seat frame 72 is mounted in a seating apparatus according to our invention.

The pivot tube 82 is slidably and rotatably disposed about the pivot bar 76. A shorter leg of the L-shaped slot 80 extends generally circumferentially, partially around the pivot tube 82, and joins a longer leg of the L-shaped slot that extends generally parallel to, and faces directly toward, an axis 84 of the lower pivot 38.

The pivot tube 82 has a length shorter than the pivot bar 76 so that the seat frame 72 can be moved transversely with respect to the pivot tube 82, when the rear of the seat frame 72 is rotated upward to place the legs of the U-shaped rail 74 in a generally parallel orientation to the legs 28, so that the pivot pin 78 can move from the short leg to the long leg of the L-shaped slot 80.

By virtue of this arrangement, a seat cushion 24 attached to the seat frame 72 is locked in the intermediate position of the seat 22, extending parallel to the legs 28, at all times that the pivot pin 78 is in the long leg of the L-shaped slot 80. Only when the seat cushion 24 has been moved transversely with respect to the legs 28, and the seat receiving recess 20, to a point where the pivot pin 78 lines up with and can move into the short leg of the L-shaped slot 80, can the seat cushion 24 be rotated into a perpendicular position with respect to the legs 28.

Those skilled in the art will also readily recognize that, while the embodiments of our invention disclosed herein are presently considered to be preferred, various changes and modifications can be made without departing from the spirit and scope of the invention.

For example, it may not be desired in some embodiments of our invention to include an anti-pivoting mechanism of the type described in relation to FIGS. 3 and 5. In other embodiments of our invention, where it is desired to have a passenger on the seat 22 facing across the vehicle rather than forward as shown in FIG. 1, it may be desirable to attach the seat back 26 to a side of the seat cushion 24, rather than the rear of the seat cushion 24 as shown in FIGS. 2a–2d, so that distal edge 52 of the seat back 26 folds in a direction parallel to the seat receiving recess 20 when the seat 22 is in the deployed position. Those having skill in the art will also recognize that our invention may be practiced in seating arrangements where it is desirable to have the passenger seated on the seat 22 facing rearward in the vehicle, and in vehicles where it is desirable to have the seat receiving recess 20 positioned beside the seat 22, rather than in front of or behind the seat 22, as shown in the second and third row seating apparatuses 16, 18 of the exemplary embodiments shown in FIG. 1.

The cover 54 can be provided in a number of forms that are entirely removable during deployment and stowage of the seat 22, or movable and stowable in many forms including, a roll top cover, or a rigid cover hinged to the floor 12 as a single cover, a bi-fold cover, or multifold cover. Although we contemplate that it will generally be preferable that the upper surface 56 of the cover 54 extend substantially parallel to the floor surface 14, when the cover 54 is closed, so that the floor surface 14 will be substantially flat when the seats 22 are stowed beneath the floor 12 in the seat receiving recesses 20, in some embodiments of our invention it may be desirable to have the surface 56 of the cover 54 extend above or below the floor surface 14, or to not utilize a cover 54.

The scope of the invention is indicated in the appended claims, and all changes or modifications within the meaning and range of equivalents are intended to be embraced therein.

We claim:

1. A stowable seat for a vehicle comprising:
   a seat receiving recess in a floor;
   a seat and a leg operatively attaching the seat to the floor for selective movement of the seat with respect to the seat receiving recess between a deployed position of the seat and a stowed position of the seat in the seat receiving recess;
   the leg having an upper pivot operatively attached to the seat and a lower pivot operatively attached to the floor for selective pivoting movement of the seat between the deployed and the stowed positions of the seat by pivoting the seat about the upper pivot and pivoting the leg about the lower pivot between a substantially vertical deployed position of the leg and a substantially horizontal stowed position of the leg, wherein the seat is selectively movable about said lower pivot in a transverse direction with respect to the seat receiving recess.

2. The stowable seat of claim 1 wherein the seat is movable about said lower pivot between a first transverse position of the seat whereat the seat cannot be pivoted into the seat receiving recess and a second transverse position of the seat whereat the seat can be pivoted into the seat receiving recess.

3. The stowable seat of claim 1 wherein the seat is substantially flush with the floor surface when the seat is stowed in the seat receiving recess in the floor.

4. A stowable seat for a vehicle comprising:
   a seat receiving recess in a floor;
   a seat having a leg operatively attaching the seat to the floor for selective movement of the seat with respect to the seat receiving recess between a deployed position of the seat, an intermediate position of the seat, and a stowed position of the seat;
   the leg having an upper pivot operatively attached to the seat and a lower pivot operatively attached to the floor for selective movement of the leg between a deployed position of the leg and a stowed position of the leg, wherein the seat is selectively movable about said lower pivot in a transverse direction with respect to the seat receiving recess;

the leg in the substantially vertical deployed position of the leg supporting the seat in both the deployed position and intermediate positions of the seat, with the seat extending substantially perpendicualr to the leg in the deployed position of the seat, and the seat extending substantially parallel to the leg in the intermediate position of the seat;

the seat being operatively attached to the upper pivot of the leg for selective movement with respect to both the seat receiving recess and the leg, between the deployed position of the seat, whereat the seat extends substantially perpendicular to the leg with the leg in the deployed position of the leg, and the intermediate position of the seat whereat the seat extends substantially parallel to the leg with the leg in the deployed position of the leg;

the seat selectively movable between the intermediate position of the seat and the stowable position of the seat by pivoting the seat about the lower pivot of the leg.

5. The stowable seat of claim 4 wherein the seat is operatively attached to the leg and floor for translating movement about said lower pivot in a transverse direction with respect to the seat receiving recess, between a first transverse position of the seat whereat the seat cannot be pivoted into the seat receiving recess and a second transverse position of the seat whereat the seat can be pivoted into the seat receiving recess.

6. The stowable seat of claim 5 wherein the lower pivot includes a locking mechanism for locking the leg against being pivoted about the lower pivot from the deployed position of the leg when the seat is in the first transverse position of the seat, and wherein said locking mechanism further allows the leg to be pivoted about said lower pivot into the stowed position of the leg when the seat is in the second transverse position of the seat.

7. A stowable seating apparatus for a vehicle having a floor defining a floor surface, the seating apparatus comprising:

a seat receiving recess in the floor, extending downward from the floor surface and opening upward through the floor surface; and a seat having a seat cushion, a foldable seat back, and a leg operatively attaching the seat cushion to the floor for selective movement of the seat with respect to the seat receiving recess between a deployed position of the seat, an intermediate position of the seat, and a stowed position of the seat;

the seat cushion having an upper surface for receiving the buttocks of a passenger when the seat is in the deployed position, and a lower surface facing the floor surface when the seat is in the deployed position;

the foldable seat back pivotably attached to the seat cushion to be foldable upon the upper surface of the seat cushion to a folded position of the seat back, and openable to an open position of the seat back for supporting the back of a passenger seated upon the cushion;

the leg having an upper pivot operatively attached to the lower surface of the seat cushion and a lower pivot operatively attached to the floor for selective movement of the leg between a substantially vertical deployed position of the leg and a substantially horizontal stowed position of the leg, with the leg in the substantially horizontal stowed position extending into the seat receiving recess in a direction substantially parallel to the floor surface, wherein the seat is operatively attached to the leg and floor for translating movement about said lower pivot in a transverse direction with respect to the seat receiving recess, between a first transverse position of the seat whereat the seat cannot be pivoted into the seat receiving recess and a second transverse position of the seat whereat the seat can be pivoted into the seat receiving recess;

the leg in the substantially vertical deployed position of the leg supporting the seat cushion in both the deployed position and intermediate positions of the seat with the seat cushion extending substantially perpendicular to the leg in the deployed position of the seat, and the seat cushion extending substantially parallel to the leg in the intermediate position of the seat;

the seat cushion being operatively attached to the upper pivot of the leg for selective movement with respect to both the seat receiving recess and the leg, between the deployed position of the seat, whereat the seat cushion extends substantially perpendicular to the leg with the leg in the deployed position of the leg and the seat back in either the open or the folded position, and the intermediate position of the seat whereat the seat cushion with the seat back folded thereupon extends substantially parallel to the leg with the leg in the deployed position of the leg;

the seat selectively movable between the intermediate position of the seat and the stowed position of the seat within the seat receiving recess by pivoting the seat about the lower pivot of the leg; and wherein the upper pivot includes a locking mechanism for locking the seat against being pivoted about the upper pivot when the seat is a first transverse position of the seat with respect to the leg, and wherein said locking mechanism further allows-the seat to be pivoted about the upper pivot when the seat is in a second transverse position of the seat with respect to the leg.

8. The stowable seat of claim 4 wherein the leg and seat are substantially flush with the floor when the seat is stowed in the seat receiving recess in the floor.

9. The stowable seat of claim 4 further comprising a cover for closing the seat receiving recess, the cover extending substantially parallel to the floor when the cover is closing the seat receiving recess.

10. A stowable seating apparatus for a vehicle having a floor defining a floor surface, the seating apparatus comprising:

a seat receiving recess in the floor, extending downward from the floor surface and opening upward through the floor surface; and a seat having a seat cushion, a foldable seat back, and a leg operatively attaching the seat cushion to the floor for selective movement of the seat with respect to the seat receiving recess between a deployed position of the seat, an intermediate position of the seat, and a stowed position of the seat;

the seat cushion having an upper surface for receiving the buttocks of a passenger when the seat is in the deployed position, and a lower surface facing the floor surface when the seat is in the deployed position;

the foldable seat back pivotably attached to the seat cushion to be foldable upon the upper surface of the seat cushion to a folded position of the seat back, and openable to an open position of the seat back for supporting the back of a passenger seated upon the cushion;

the leg having an upper pivot operatively attached to the lower surface of the seat cushion and a lower pivot operatively attached to the floor for selective movement of the leg between a substantially vertical deployed position of the leg and a substantially horizontal stowed position of the leg, with the leg in the substantially horizontal stowed position extending into the seat receiving recess in a direction substantially parallel to the floor surface;

the leg in the substantially vertical deployed position of the leg supporting the seat cushion in both the deployed position and intermediate positions of the seat, with the seat cushion extending substantially perpendicular to the leg in the deployed position of the seat, and the seat cushion extending substantially parallel to the leg in the intermediate position of the seat;

the seat cushion being operatively attached to the upper pivot of the leg for selective movement with respect to both the seat receiving recess and the leg, between the deployed position of the seat, whereat the seat cushion extends substantially perpendicular to the leg with the leg in the deployed position of the leg and the seat back in either the open or the folded position, and the intermediate position of the seat whereat the seat cushion with the seat back folded thereupon extends substantially parallel to the leg with the leg in the deployed position of the leg;

the seat selectively movable between the intermediate position of the seat and the stowed position of the seat within the seat receiving recess by pivoting the seat about the lower pivot of the leg; and a second leg pivotably attached to the lower surface of the seat cushion for movement between a deployed position of the second leg, whereat the second leg extends substantially perpendicular to the seat cushion for supporting the seat cushion on the floor when the seat is in the deployed position, and a stowed position of the second leg, whereat the second leg extends substantially parallel to the seat cushion.

11. The stowable seating apparatus of claim 10 wherein the leg, second leg, and the lower surface of the seat cushion are substantially flush with the floor surface when the seat is stowed in the seat receiving recess in the floor.

12. The stowable seating apparatus of claim 10 further comprising a helper link operatively connected between the leg and the second leg for pivoting the second leg from the stowed position of the second leg to the deployed position of the second leg as the seat is pivoted from the intermediate position to the deployed position of the seat, and for pivoting the second leg from the deployed position of the second leg to the stowed position of the second leg as the seat is pivoted from the deployed position to the intermediate position of the seat.

13. The stowable seating apparatus of claim 12 wherein the leg, second leg, helper link, and the lower surface of the seat cushion substantially flush with the floor surface when the seat is stowed in the seat receiving recess in the floor.

14. The stowable seating apparatus of claim 10 further comprising:

a seat anchorage in the floor for receipt of the second leg in the deployed position of the second leg; and a releasable latch attached to a distal end of the second leg for engaging the seat anchorage when the second leg is in the deployed position of the second leg.

* * * * *